Nov. 16, 1965     A. E. JENSEN     3,217,737
IRRIGATION APPARATUS
Original Filed July 25, 1960     2 Sheets-Sheet 1
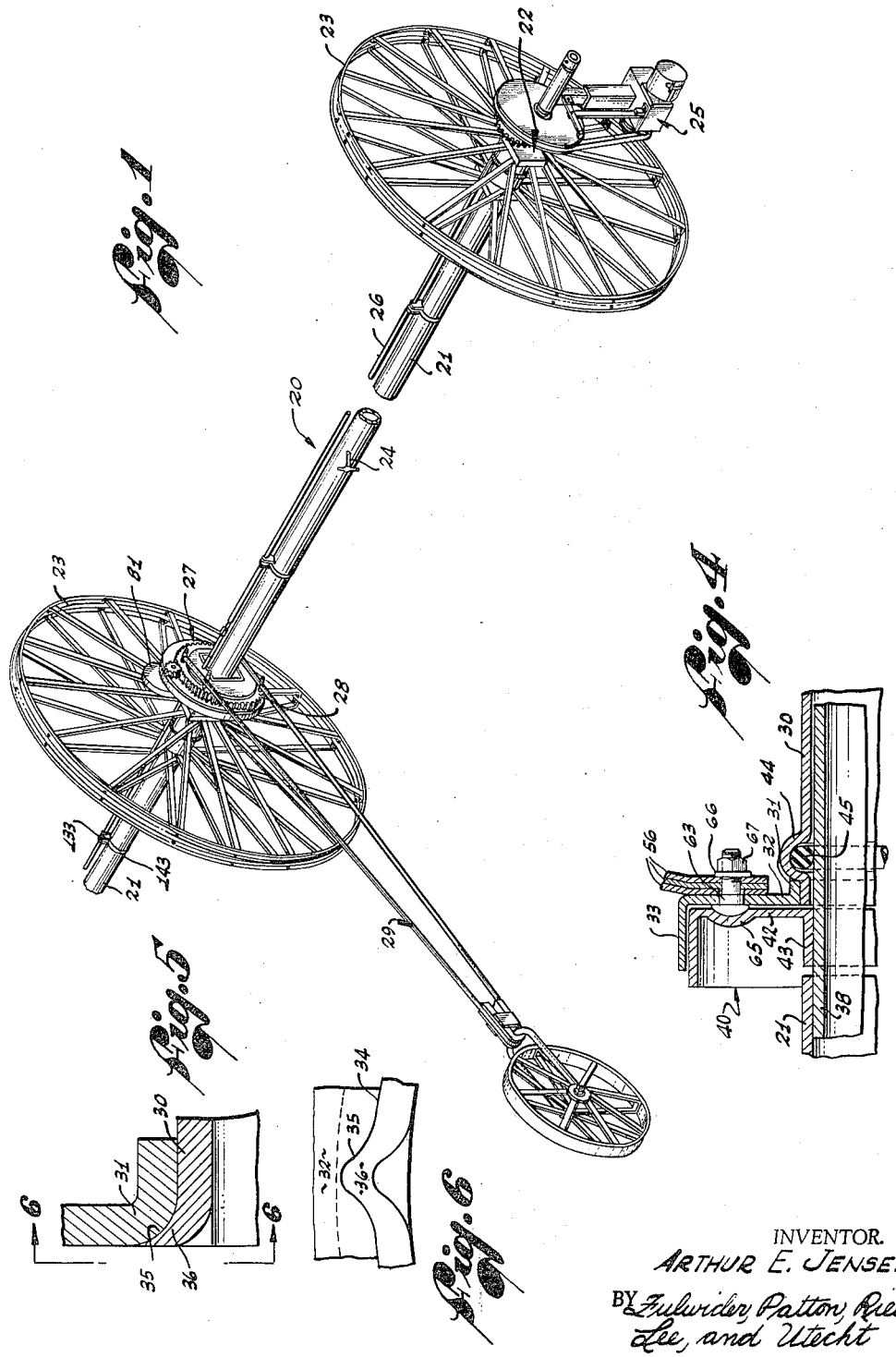
INVENTOR.
ARTHUR E. JENSEN
BY Fulwider, Patton, Rieber,
Lee, and Utecht
ATTORNEYS

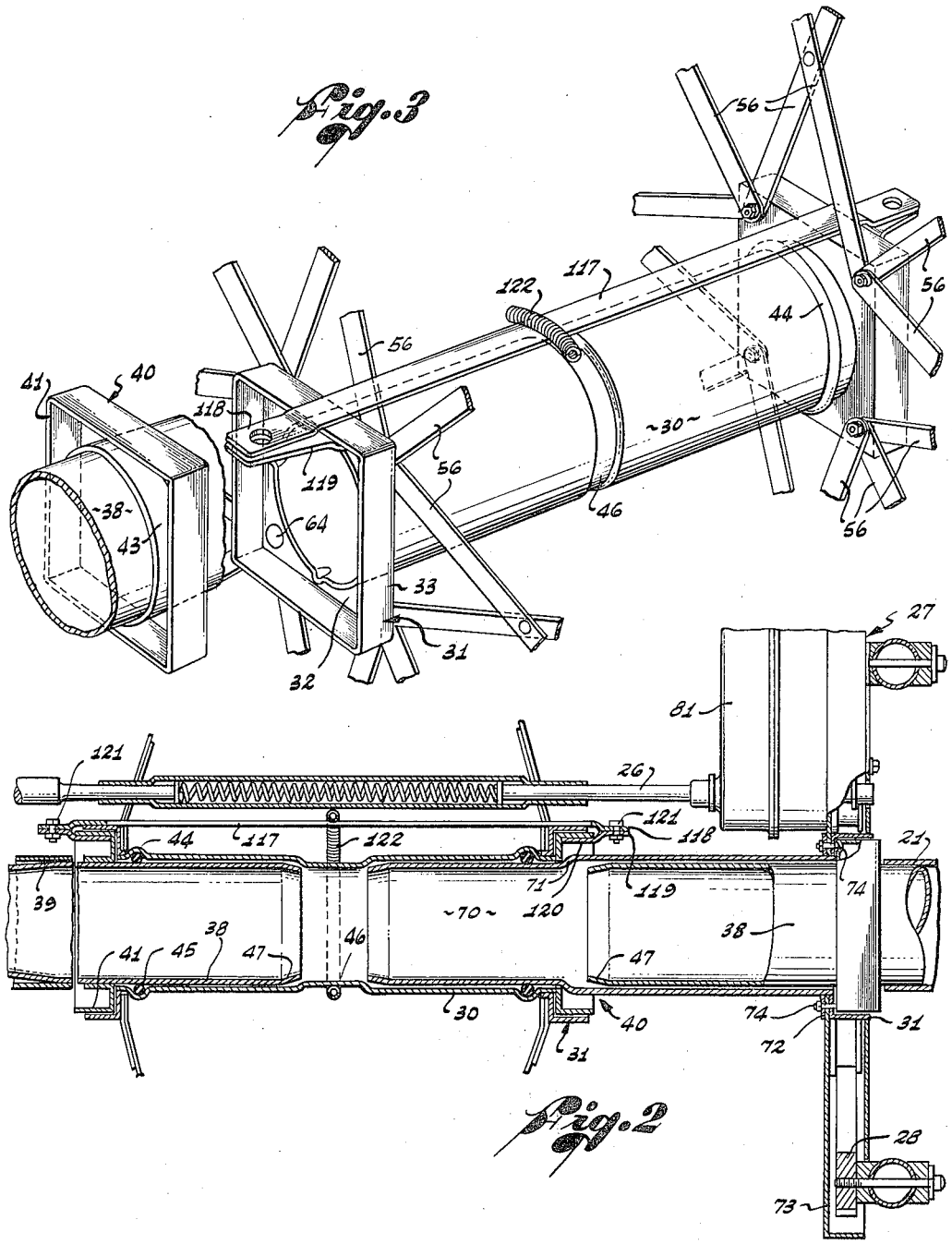

United States Patent Office

3,217,737
Patented Nov. 16, 1965

**3,217,737
IRRIGATION APPARATUS**
Arthur E. Jensen, 11372 SW. Skyline Drive,
Santa Ana, Calif.
Original application July 25, 1960, Ser. No. 45,103, now Patent No. 3,147,764, dated Sept. 8, 1964. Divided and this application Nov. 26, 1963, Ser. No. 326,273
3 Claims. (Cl. 137—344)

The present invention relates to irrigation pipelines and more particularly to a wheel-move type of line. This is a division of my co-pending patent application, Ser. No. 45,103, filed July 25, 1960 and now issued as Patent No. 3,147,764.

An object of this invention is to provide an improved means for coupling together adjacent ends of separate sections of irrigation pipe in both fluid-communicating and torque-transmitting relationship.

A further object of the invention is to provide an improvided irrigation pipe coupling means that is especially adapted for use in irrigation lines of the wheel-move type, of the class wherein the wheels and the string of pipe are co-rotatable during movement of the line from one position to another in the field.

Yet another object of the invention is to provide an improved wheel-move irrigation pipeline of simplified construction adapted for easy assembly in the field.

A still further object of the invention is to provide a wheel-move pipeline of simplified structure in that the coupling means for joining separate sections of pipe also serves as the hub of the wheel for the pipe line.

A further object of the invention is to provide an improved coupling means for wheel-move irrigation lines of the type disclosed in my Patent No. 2,946,515 and Patent No. 3,147,764.

These and other objects and advantages of my invention will be apparent from the following description of one presently preferred embodiment thereof when taken in conjunction with the annexed drawings.

FIGURE 1 is a partial perspective view of the improved wheel-supported irrigation pipeline.

FIGURE 2 is a partial sectional view taken on the axis of the line and extending through one of the power transmission units and an adjacent wheel and, further, illustrating the coupling means embodied in the wheel hub structure.

FIGURE 3 is an exploded perspective view of a portion of the wheel hub and coupler assembly.

FIGURE 4 is a partial sectional view illustrating details of the pipe coupler means in conjunction with the wheel hub construction.

FIGURE 5 is a partial sectional view illustrating one manner of drivably interconnecting a tubular hub section and a portion of the coupler means.

FIGURE 6 is a partial elevational view taken in the direction of the line 6—6 of FIGURE 5.

Referring now to the drawings for the general arrangement of the invention, and referring particularly to FIGURE 1, the apparatus includes a string 20 made of sections of irrigation pipe 21. Although FIGURE 1 shows only portions of two pipe sections 21, it will be appreciated that the string 20 may be as long as a quarter of a mile. The sections of pipe 21 are usually thirty or forty feet long and are connected in fluid communication with the adjacent pipe sections by a coupling means 22 which also serves as the hub of a wheel 23. Thus, each section of pipe 21 is supported at opposite ends by a pair of the wheels 23, and the assembled string 20, coupling means 22, and wheels 23 are adapted for co-rotation. One or more sprinklers 24 is usually secured to each pipe section 21.

A power source 25 is detachably connected to one end of the string 20 for selectively supplying either clockwise or counterclockwise torque to one end of a rotatably mounted drive shaft assembly 26 that extends in parallel relation along the string 20, to which the drive shaft assembly is affixed by means of brackets 133 and straps 143. A plurality of power transmission units 27 are mounted on the string 20 at spaced intervals therealong, preferably adjacent to and in driving engagement with one of the wheels 23. It is to be understood that normally there are fewer power transmission units 27 than there are wheels 23, there or four such units normally sufficing for a quarter mile string 20. Each of the units 27 may be of the type shown in my Patent No. 3,147,764, including an annular member 28 that is normally held rotationally immoble by a means 29, the units 27 being adapted to translate the torque of the drive shaft assembly 26 into rotation of the wheels 23 and string 20 in reaction to the rotational immobility of the annular member 28.

In lieu of the power source 25, drive shaft assembly 26 and transmission units 27, other means of applying torque to the wheel-supported string may be used.

More specifically, the ends of a pair of pipes 21 are coupled to the hub of a wheel in the manner best seen in FIGURE 2. Each wheel has a tubular hub 30 made from a relatively short section of pipe of the same diameter, preferably, as the pipe 21. At the extreme opposite ends, the hub 30 exteriorly mounts a pair of female coupling members 31. As is shown in FIGURE 4, the female members 31 preferably comprise a one piece member including a floor or base portion 32 disposed radially of the hub 30 and surrounded by a continuous square wall portion 33, the wall extending axially outwardly beyond the end of the hub 30. The floor portion 32 is formed with a central opening 34 adapted to slip over the end of the hub 30 and formed with at least one notch 35 to receive a complementary dimple 36 pressed in the end of the hub 30 (see FIGURES 5 and 6). The hub 30 and female members 31 are thereby coupled together for co-rotation.

Both ends of the pipe 21 internally telescopically receive one end of a short tubular coupler section 38. One end 39 of the coupler section 38 is formed with a taper for insertion into the end of the pipe 21 and the coupler section 38 has an external diameter adapted for a press fit in the pipe to achieve co-rotation of the coupler section and pipe. At about its mid portion, each coupler section 38 exteriorly mounts a male coupling member 40 that is complementarily matingly receivable in the female member 31 at one end of the hub 30. The male member 40 is also provided with a square continuous wall 41 to be received within the square wall 33 of the female member 31. A base or floor section 42 of the male member 40 has a central opening defined by a cylindrical flange 43 which receives the coupler section 38 and is secured thereto by welding or other suitable fastening means.

The other end of each coupler section 38 is slidably receivable within an end of the hub 30. In order to provide a fluid seal between the exterior of the coupler section 38 and the interior of the hub 30, the hub has a pair of circumferentially extending grooves 44 formed immediately inwardly of one of the female members 31 for the reception of an O-ring seal 45. The mid portion of the hub 30 is of reduced diameter, as indicated at 46 and the corresponding ends of the coupler sections 38 are flared inwardly as indicated at 47, for each entry into the hub, to the extent permitted by the internal shoulder of an end of the mid-portion 46, or by engagement of the coupling members 31 and 40.

FIGURE 2 shows a wheel hub 30 having a coupler section 38 only in the left end, the right end of the hub having a means for mounting one of the power transmission units 27. However, it is to be borne in mind that not every wheel has one of the units 27 mounted adjacent thereto. Accordingly a wheel without one of the units 27 has a pair of the coupler sections 38 extending from the opposite ends of the hub 30.

The wheels 23 have spokes 56 that are secured to the coupler and hub means 22 in the manner shown in FIGURE 4, which is a section taken diagonally through the corners defined by the continuous wall 33 of the female member 31, although of course, the rim of the wheel can be otherwise interconnected to the hub. An opening is formed in the floor portion 32 of the member 31 at the corner, adapted to receive the head end of a carriage bolt 63. The head of the bolt 63 is disposed within the female member 31 and in order to permit a closer engagement of the male member 40 with the female member, the floor portion 42 of the male member is provided with suitably located dimples 65. The bolt extends through suitable openings formed in the radially inner ends of the spokes 56, which are secured in place under a suitable washer 66 and nut 67.

A means similar to the coupler section 38 is provided for mounting each of the power transmission units 27 immediately adjacent and in driving engagement with a hub 30 of selected ones of the wheels 23. As is shown in FIGURE 2, this means includes a mounting tube 70, made of a relatively short section of pipe having one end portion adapted to be telescopically slidably received within an end of a hub 30. The mounting tube 70 has an expanded end portion, protruding outwardly from the hub 30, and defining a circumferentially extending shoulder 71 on the tube. One of the male coupling members 40 is rigidly secured to the mounting tube 70 immediately inwardly of the shoulder 71 for mating reception within the corresponding female member 31.

At its outer end the mounting tube 70 has an exterior plate 72 rigidly secured thereto for mounting a housing 73 and one of the female members 31 by a plurality of fastener means 74, these fastener means corresponding to those illustrated in FIGURE 4, and it further being understood that they are located at the corners of the member. Another coupler section 38 is then slipped into the expanded end of the mounting tube 70 until the coupler section's male member 40 is matingly engaged with the female member 31 of the mounting tube 70, and the portion of the coupler section 38 extending outwardly from the male member 40 supports another section 21 of irrigation pipe.

Each of the transmission units 27 may be of the type shown in my Patent No. 3,147,764 and would include the gear box 81, through which the drive shaft assembly 26 extends, and which is also mounted on the plate 72. The details of the transmission unit 27 are shown in said Patent No. 3,147,764 and accordingly are omitted here. However, the coupler and hub construction described above have special utility in combination with the transmission unit 27 or with transmission units of the type shown in my Patent No. 2,946,515.

FIGURE 2 shows an arrangement for interlocking the coupled members 31 and 40 at the opposite ends of the hub to insure the integrity of the assembly whether the string 20 is being moved over even or uneven ground. This interlocking means includes an elongated band 117, longer than the hub assembly and having offset end portions 118, extending beyond the couplers at the opposite ends of the hub assembly. A clamping arm 119 is provided for each end of the band 117 that is formed with a bore alignable with a bore formed in the corresponding offset end 118. The clamping arm 119, in turn, has an offset portion 120 engageable beneath one side wall of the male coupler 40. The clamping arms 119 are secured in place by a suitable fastening means 121. A spring 122 may be tied around the hub 30 at the reduced mid portion 46 and around the band 117, to more securely hold the band against displacement.

It will be apparent in carrying out the invention that a great many variations from the specific details of construction hereinabove set forth are possible. Accordingly, it is to be understood that I do not mean to be limited to such details but only by the spirit and scope of the following claims.

I claim:

1. In combination: a wheel having a tubular hub; a first pair of couplers coaxially mounted around opposite ends of said hub in driving engagement with said hub; a pair of coupler tubes telescopically slidably mounted in opposite ends of said hub; a second pair of couplers, each of which is fixed on one of coupler tubes in driving mating engagement with one of said first pair of couplers of said hub whereby said hub and said coupler tubes are co-rotatable, each of said first pair of couplers being adapted for said driving engagement with one of said second pair of couplers within a limited range of telescopic sliding movement of said hub and the corresponding one of said coupler tubes; a pair of fluid sealing means mounted interiorly of said hub for circumferential fluid sealing engagement between said hub and said pair of coupler tubes; and exteriorly disposed means on said hub and interconnected with said matingly engaged couplers to limit axial withdrawal of said couuler tubes from said hub to a range within which said first and second pairs of couplers remain drivingly engaged.

2. A coupling for adjacent ends of cylindrical pipe members of a wheel move irrigation pipe line comprising:
   a coupler tube comprising a short cylindrical section of pipe of a diameter at one end adapted for a telescopic press fit with one of a pair of adjacent ends of the cylindrical pipe members to be joined;
   said coupler tube at its other end being of a diameter adapted for telescopic sliding mating engagement with the other of the pair of adjacent ends of the cylindrical pipe members to be joined;
   a first coupling member rigidly affixed to the exterior of said coupler tube between the opposite ends of said coupler tube to protrude radially outwardly thereof;
   a second coupling member rigidly affixed to the exterior of said other one of the pair of cylindrical pipe members to be joined and positioned adjacent the end of said other pipe member;
   said first and second coupling members being adapted to be drivingly interconnected by opposed axial movement of said coupler tube and said other pipe member in order to couple said tube and said other pipe member together in driving engagement within a limited range of telescopic sliding movement of said coupler tube in the said other pipe member.

3. A coupling as set forth in claim 2 in which each of said coupling members comprises a radially disposed flange having a noncircular perimeter that is bounded by a noncircular axially disposed wall, the walls of said first and second coupling members being adapted for closely mating telescopic engagement.

References Cited by the Examiner
UNITED STATES PATENTS 2,665,169   1/1954   Tipton _____ 137—344
2,730,403   1/1956   Huntley _____ 137—344

M. CARY NELSON, *Primary Examiner.*